(No Model.)
D. T. KENDRICK.
CAMERA TRIPOD JOINT.
No. 318,480. Patented May 26, 1885.
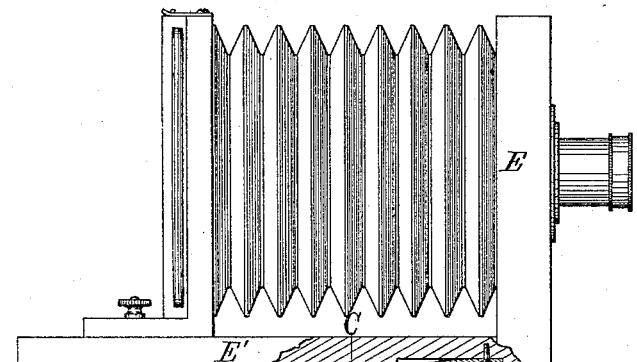
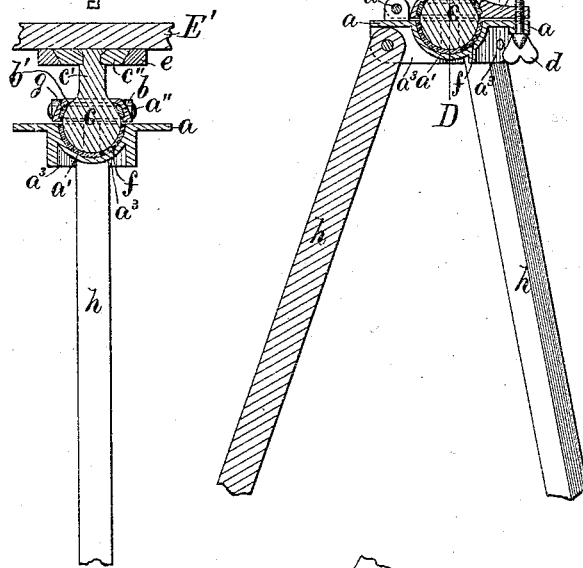
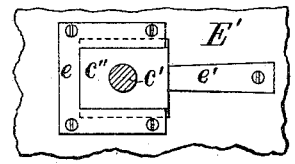
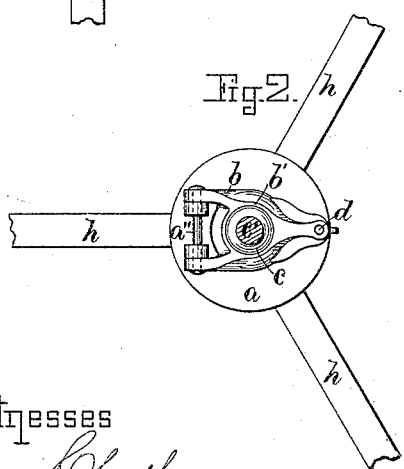
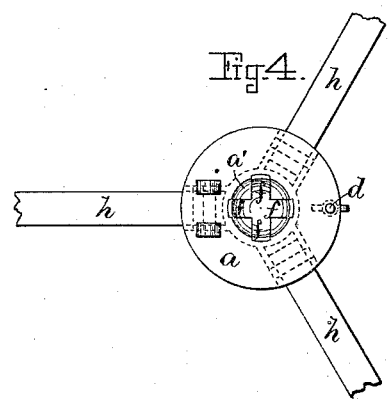
Witnesses
Henry Chadbourn.
L. B. Hunt.
Inventor
Dyer T. Kendrick
by Alban Andrew, his atty

UNITED STATES PATENT OFFICE.

DYER T. KENDRICK, OF PROVIDENCE, RHODE ISLAND.

CAMERA-TRIPOD JOINT.

SPECIFICATION forming part of Letters Patent No. 318,480, dated May 26, 1885.

Application filed February 24, 1885. (No model.)

*To all whom it may concern:*

Be it known that I, DYER T. KENDRICK, a citizen of the United States, residing at Providence, in the county of Providence and State of Rhode Island, have invented certain new and useful Improvements in Camera-Tripod Joints; and I do hereby declare that the same are fully described in the following specification and illustrated in the accompanying drawings.

This invention relates to improvements in tripod-joints for photographic cameras, and it is made for the purpose of enabling the camera to be adjusted in a universal manner upon its tripod, so as to take in any desired object or view without the need of adjusting the tripod, for which purpose the invention is carried out as follows, reference being had to the accompanying drawings, where—

Figure 1 represents a vertical section of the tripod-joint, showing it as applied to a photographic camera. Fig. 2 represents a cross-section on the line A B shown in Fig. 1. Fig. 3 represents a vertical section on the line C D shown in Fig. 1. Fig. 4 represents a plan view of the tripod-joint, with its upper hinged plate shown as removed; and Fig. 5 represents a cross-section on the line A B in Fig. 1, as seen from below said line.

Similar letters refer to similar parts wherever they occur on the different parts of the drawings.

The joint is made in two parts, viz., a lower plate, $a$, having a semi-spherical cup or depression, $a'$, as shown in Figs. 1, 3, and 4, to the upper side of which is hinged, by means of hinge-pin $a''$ or similar device, the upper adjustable clamping-plate, $b$, that is centrally perforated and provided in its upper end with an inwardly-projecting annular rim, lip, or flange, $b'$. (Shown in Figs. 1 and 3.) Within the cup $a'$ is supported the ball $c$, it being held and clamped in position between it and the flange $b'$ by means of the thumb-screw $d$ passing loosely through one end of the lower plate, $a$, and screwed into a screw-threaded perforation in the corresponding end of the upper plate, $b$, as shown in Fig. 1, or vice versa.

$c'$ is the upwardly-projecting shank of the ball $c$, to the upper end of which is secured the plate $c''$, which is inserted into and between the dovetailed sides of the guide-plate $e$, that is firmly secured to the under side of base-plate $E'$ of the camera $E$, as shown in Figs. 1, 3, and 5, and after being so inserted the plate $c''$ is prevented from getting detached from guide-plate $e$ by the free end of the locking-spring $e'$, secured in a suitable manner to the under side of base-plate $E'$, as shown in Figs. 1 and 5.

To detach the tripod-joint and its plate $c''$ from the camera it is only necessary to press the free end of locking-spring $e'$ upward to free it from the end of plate $c''$, after which the latter may be withdrawn from the guide-plate $e$. This is a very practical device, and a very essential one on cameras used for taking out-door views, or on any other portable cameras.

To save expensive turning or finishing work on the interior of cup $a'$ to make it fit against the ball $c$, I provide said cup $a'$ with bearing-strips $f\,f$, located in grooves or recesses on the interior of said cup $a'$, such bearing-strips being made of leather, Babbitt or other soft metal, or any other suitable bearing material to make a true bearing-surface on and against the lower portion of the properly turned or finished ball $c$. For the same reason I provide the interior of the clamping-plate $b$ with an annular bearing-ring, $g$, made of leather or soft metal, or other suitable bearing material, such ring being adapted to bear against the upper annular portion of ball $c$, and made to rest in a corresponding annular groove on the interior of the clamping-plate $b$, as shown in Figs. 1 and 3.

To the under side of the plate $a$ are cast or otherwise secured the lugs or ears $a^3\,a^3$, to which are hinged the tripod-legs $h\,h\,h$ in the usual manner.

In using my invention I proceed as follows: I first expand the tripod-legs $h\,h\,h$ and set the tripod firmly on the ground in any convenient position. I then attach the camera to the tripod-joint simply by pressing the locking-spring $e'$ upward and sliding the plate $c''$ into the guide-plate $e$ as far as it will go, when the base-plate $E'$ of the camera will automatically be locked to plate $c''$ by the liberation of the free end of the locking-spring $e'$, as shown in Fig. 1. The camera may now be swung, inclined, or adjusted to any required position and secured firmly to the tripod by simply tightening the thumb-screw $d$ without the need of adjusting the positions of the tripod-legs, and thus save much valuable time in setting up and adjusting portable cameras.

Having thus fully described the nature, construction, and operation of my invention, I wish to secure by Letters Patent and claim—

1. The herein-described tripod-joint consisting of the lower cup-shaped plate, $a\ a'$, and upper clamping-plate, $b$, hinged together at $a''$, and provided with the fastening-screw $d$, in combination with the ball $c$ and its shank $c'$, as and for the purpose set forth.

2. The lower cup-shaped plate, $a\ a'$, and upper clamping-plate, $b$, hinged together at $a''$, and provided with clamping-screw $d$, in combination with the bearing-surfaces $f\ f\ g$, and the ball $c$ with its shank $c'$, as and for the purpose set forth.

3. The cup-shaped plate $a\ a'$ and upper clamping-plate, $b$, hinged together at $a''$ and having clamping-screw $d$, as described, in combination with ball $c$, shank $c'$, and plate $c''$, the guide-plate $e$, and locking-spring $e'$ on the base of camera E, as and for the purpose set forth.

In testimony whereof I affix my signature in presence of two witnesses.

DYER T. KENDRICK.

Witnesses:
 ALBAN ANDRÉN,
 HENRY CHADBOURN.